No. 668,584. Patented Feb. 19, 1901.
F. PUFF & F. LAY.
MACHINE FOR DRYING CORN.
(Application filed Feb. 28, 1900.)
(No Model.)
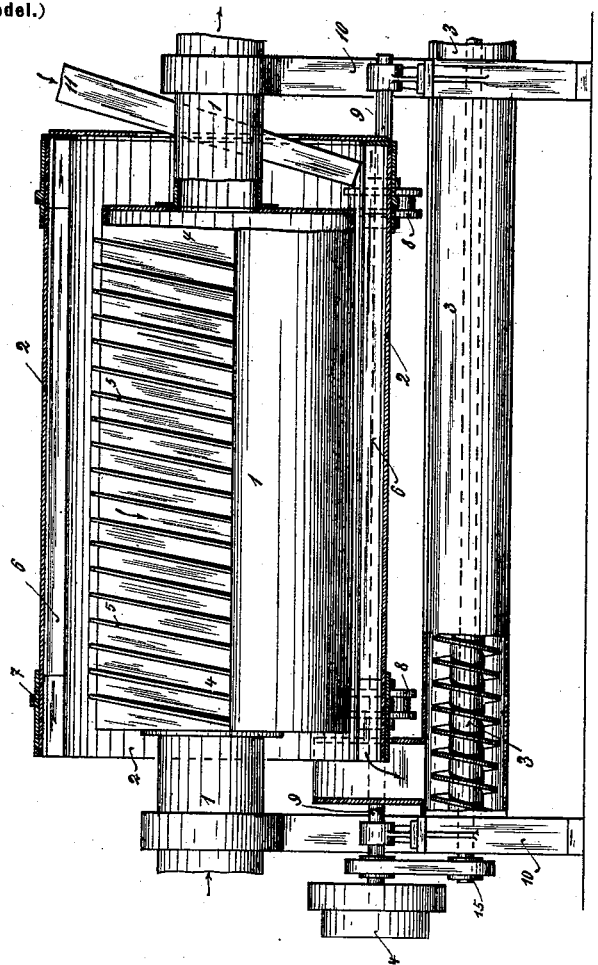
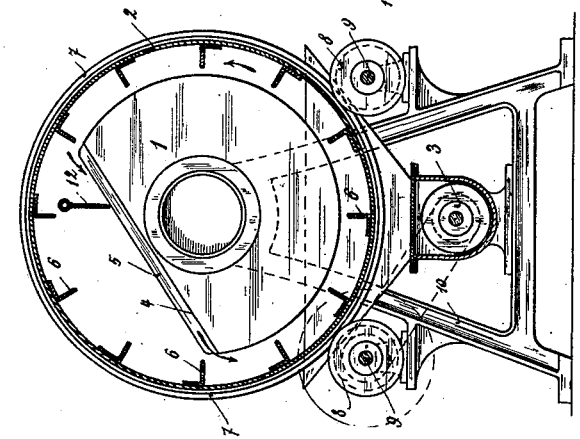
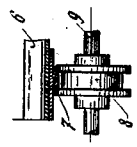
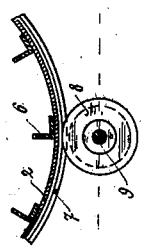
Witnesses:
Inventors:
Franz Puff.
Franz Lay

UNITED STATES PATENT OFFICE.

FRANZ PUFF, OF FORCHHEIM, AND FRANZ LAY, OF NUREMBERG, GERMANY.

MACHINE FOR DRYING CORN.

SPECIFICATION forming part of Letters Patent No. 668,584, dated February 19, 1901.

Application filed February 28, 1900. Serial No. 6,809. (No model.)

*To all whom it may concern:*

Be it known that we, FRANZ PUFF, a subject of the King of Bavaria, residing at Forchheim, and FRANZ LAY, a subject of the King of Saxony, residing at Sulzbachstrasse 48, Nuremberg, Germany, have invented certain new and useful Improvements in Machines for Drying Grain; and we do hereby declare the following to be a full, clear, and exact description of the invention, such as will enable others skilled in the art to which it appertains to make and use the same.

This invention relates to improvements in machines for drying grain, the object being by a revolving cylinder continually to bring the grain upon an inclined plane, where it is dried by steam, and gliding down to a worm conveying it out of the machine.

With reference to the accompanying drawings, Figure 1 represents a cross-section of our improved machine. Fig. 2 is a side elevation of it, partly in section. Figs. 3 and 3$^a$ show in detail one of the rollers driving the rotary cylinder, and Fig. 4 is a plan view of the conveyer bar or rib which is secured to the inner wall of the revolving cylinder.

Our improved machine consists of a semicylindrical steam-box 1, a revolving hollow cylinder 2, inclosing this steam-box, and a worm conveyer for conveying the dried grain from the machine. The steam or drying box is continually warmed by steam passing through it in the direction indicated by the arrows. The upper surface of the said box is formed as an inclined plane 4 and is provided with inclined guide-ribs 5. The cylinder 2 has secured on its inner wall a series of angle-bars 6, Fig. 1, which when the cylinder 2 is rotating shovel up the grain from the bottom of the cylinder and throw it upon the inclined top 4 of the drying-box 1, where in sliding down by gravity it is guided by the ribs 5 toward the open or left-hand end of the cylinder 2.

As seen in Fig. 4, the bars 6 at their ends are bent at angles to facilitate taking up the grain at one end of the cylinder and delivering it over the top of the box. The cylinder 2 is surrounded near its ends by rings 7, which frictionally engage the rollers 8. These rollers are mounted on shafts 9, supported by standards on the frame 10 and driven by a pulley 14. Below the cylinder 2 on a suitable shaft is arranged a worm conveyer 3, driven by a pulley 15, secured to one end of the shaft.

The operation of our improved machine is as follows: The grain is introduced through the chute 11 into the cylinder 2, where it is taken up by the bars 6 and thrown upon the inclined top of the drying-box, where it is dried by the heat of the steam passing through the box, and the grain slides down along the top, being directed by the inclined ribs 5 toward the open end of the cylinder to the worm 3, which conveys it from the left to the right and out of the machine. A gate 12, hung over the top of the box 1, controls the movement of the grain over such top.

Having thus described our invention, what we claim is—

1. In a machine for drying grain, the combination with a drying-box and a conveyer-worm, of a cylinder rotated by friction-rollers and having on its inner surface angle-bars bent in opposite directions at their ends.

2. In a machine for drying grain, the combination of a revolving cylinder having angle-bars secured to its inner surface, a non-rotatable drying-box arranged in said cylinder and provided with an inclined top having secured thereto diagonally-disposed guide-ribs, and a gate over said drying-box, substantially in the manner set forth.

In testimony whereof we affix our signatures in presence of two witnesses.

FRANZ PUFF.
FRANZ LAY.

Witnesses:
A. WIELE,
M. SCHNEIDER.